United States Patent [19]
Molnar

[11] 4,427,475
[45] Jan. 24, 1984

[54] MANUFACTURE OF WRINKLE-FREE FLOUROPLASTIC LAMINATED PANELS

[75] Inventor: Bela Molnar, London, Canada

[73] Assignee: Protective Plastics Limited, Scarborough, Canada

[21] Appl. No.: 412,811

[22] Filed: Aug. 30, 1982

Related U.S. Application Data

[63] Continuation of Ser. No. 278,214, Jun. 29, 1981, abandoned.

[30] Foreign Application Priority Data

May 11, 1981 [CA] Canada .................................. 377261

[51] Int. Cl.³ .............................................. B32B 31/04
[52] U.S. Cl. .................................. 156/163; 100/215; 156/229; 156/495; 156/583.1
[58] Field of Search ........ 156/163, 212, 229, 494–496, 156/581, 583.1, 583.3; 100/215, 194

[56] References Cited

U.S. PATENT DOCUMENTS

| | | | |
|---|---|---|---|
| 2,194,551 | 3/1940 | Holman | 156/163 |
| 2,570,273 | 10/1951 | Pryor | 156/163 |
| 2,991,216 | 7/1961 | Hsu et al. | 156/163 |
| 3,655,472 | 4/1972 | Chandler | 156/163 |
| 4,001,074 | 1/1977 | Pagnoni | 100/215 |
| 4,145,239 | 3/1979 | Fujii | 156/229 |
| 4,257,840 | 3/1981 | Fujii | 156/556 |
| 4,268,000 | 5/1981 | Ulm | 156/163 |

*Primary Examiner*—Jerome W. Massie
*Attorney, Agent, or Firm*—Ridout & Maybee

[57] ABSTRACT

A process and apparatus for manufacturing a laminated panel wherein a plurality of layers are laminated together under heat and pressure in a press having upper and lower platens, the uppermost layer being a thin film of fluoroplastics material. The film is suspended from the upper platen and stretched in a substantially horizontal plane spaced therefrom, the press thereupon being closed to press the film into contact with the adjacent layers of the laminate. The apparatus of the present invention comprises a laminating press having upper and lower platens, and rolls positioned outside of the press and adjacent the ends of the upper platen for suspending a film of fluoroplastics material longitudinally beneath the upper platen. Means are provided for stretching the film laterally to cause it to lie in a substantially horizontal plane spaced from the upper platen, comprising substantially horizontal rails positioned adjacent the sides of the press, below the level of the upper platen where the latter is raised, and multiple resilient connector elements for connecting the edges of the film to the rails.

6 Claims, 5 Drawing Figures

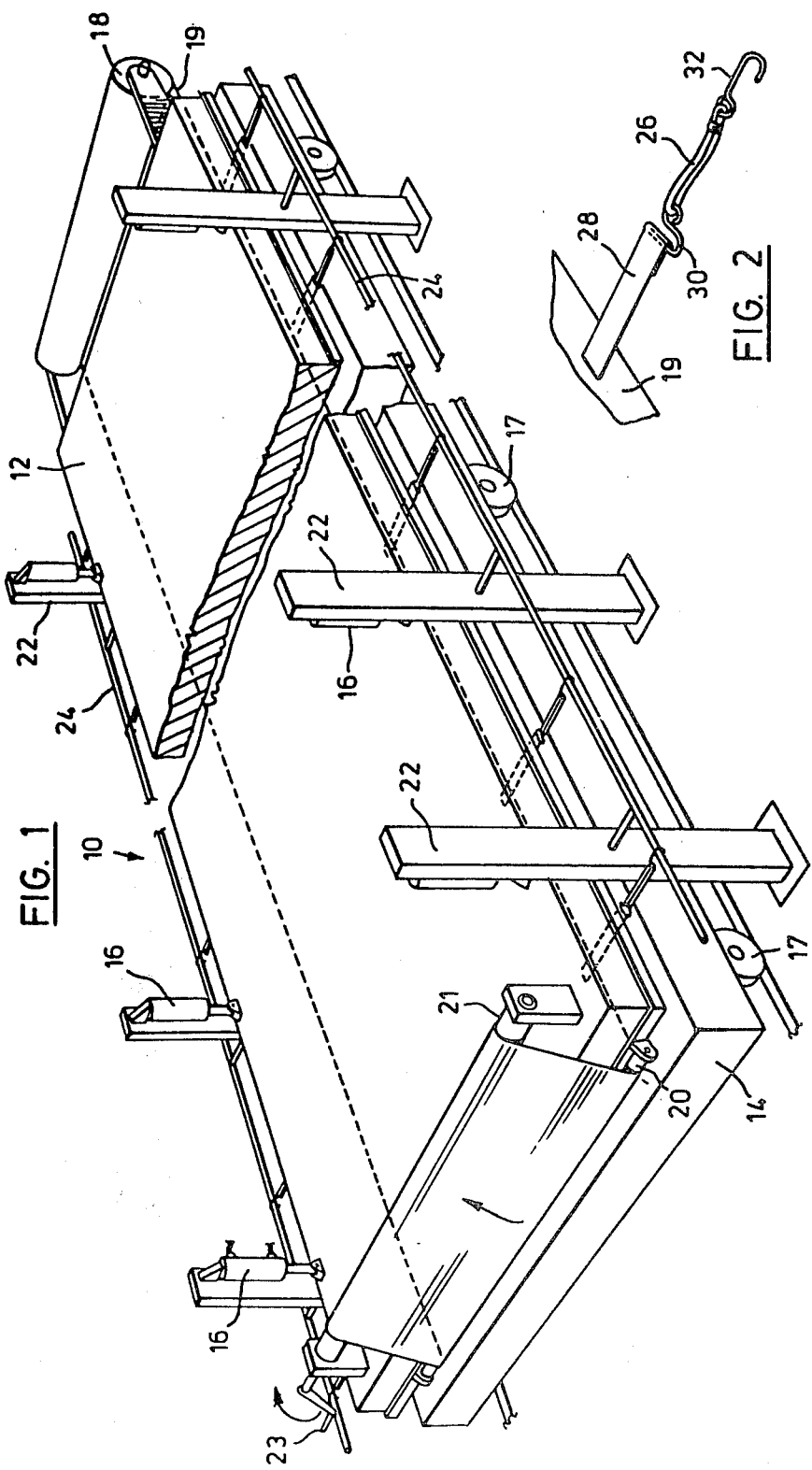

MANUFACTURE OF WRINKLE-FREE FLOUROPLASTIC LAMINATED PANELS

This application is a continuation of application Ser. No. 278,214, filed June 29, 1981, now abandoned.

FIELD OF THE INVENTION

This invention relates to the manufacture of laminated panels. In particular, it relates to improvements in the manufacture of composite panels of the type having an outer film of weather resistant fluoroplastics material bonded thereto.

BACKGROUND OF THE INVENTION

In the manufacture of laminated panels in which a core of plywood has a layer of glass fiber reinforced resin bonded on one or both faces a film of weather resistant fluoroplastics material is often bonded to the exterior thereof to protect the panel from deterioration due to weathering, and from crazing when the panel is flexed.

One of the difficulties associated with the manufacture of such panels is that the fluoroplastics film often tends to wrinkle and crease while it is being applied to the surface of the uncured resin layer, and the removal of such minor flaws from the film prior to curing is both difficult and time-consuming.

It is an object of the present invention to provide a method and apparatus to avoid or reduce this difficulty.

SUMMARY OF THE INVENTION

Accordingly, this invention provides a process for manufacturing a laminated panel which comprises superposing on one face of a laminar core a sheet of resin-impregnated preferably woven fibrous material, positioning the core horizontally, with said superposed sheet uppermost, in a press having upper and lower platens, suspending a film of weather resistant fluoroplastics material from the upper platen of the press, stretching the film horizontally to cause the film to lie in a substantially horizontal plane spaced from the lower face of said upper platen, lowering the upper platen to bring the film into contact with the layer of fibrous material, closing the press to press the film into contact with the layer of fibrous material, and laminating the assembly under heat and pressure to bond said layer to the core and said film to the layer.

The present invention also provides an apparatus for manufacturing a laminated panel consisting of a plurality of layers, the uppermost layer being a thin film of fluoroplastics material, comprising a laminating press having upper and lower platens, first and second substantially horizontal rolls positioned laterally, outside of the press, near the ends of the upper platen, and adapted to take up the ends of said film, and thereby to suspend it longitudinally below the upper platen, spacer means for spacing the film from the upper platen, while the latter is raised, a pair of substantially horizontal rails positioned longitudinally adjacent the sides of the press, at a level below that to which the upper platen is raised, multiple resilient connector elements spaced along each of said rails and connected thereto, said elements being engageable with the edges of the film to stretch the film laterally in a substantially horizontal plane below the upper platen.

The film of fluoroplastics material may be a 1½ mil. thick film of polyvinylfluoride such as that sold by the Dupont Corporation under the trade mark TEDLAR, and which has been pretreated for adherability on one or both sides.

The product may be in the form of a slab measuring 10'×46' and having a core of ¾ inch plywood coated with layers of glass fiber reinforced polyester resin on both faces, with a film of fluoroplastics material covering one or both layers.

The glass fiber can suitably be a 24 ounce/yard woven roving.

The production of the laminated panel involves, basically, the preparation of the composite panel prior to insertion into the press for curing, the suspension and stretching of the fluoroplastics film, positioning the composite panel in the press, beneath the film, and closing the press to promote the curing of the composite panel under heat and pressure.

The production of the laminated panel involves the use of a hydraulically operable press having a work area which is larger than the dimensions of the panel, and substantially horizontal upper and lower platens, both platens being adapted to be heated to temperatures in a range suitable for promoting the curing of the polyester resin and at the same time bonding the film to it.

BRIEF DESCRIPTION OF THE DRAWINGS

FIG. 1 is a partly broken-away perspective view of a press having a device attached thereto for suspending and stretching a film from the upper platen thereof;

FIG. 2 is a fragmentary view, showing a detail of the device;

DESCRIPTION OF THE PREFERRED EMBODIMENT

Figure 3:
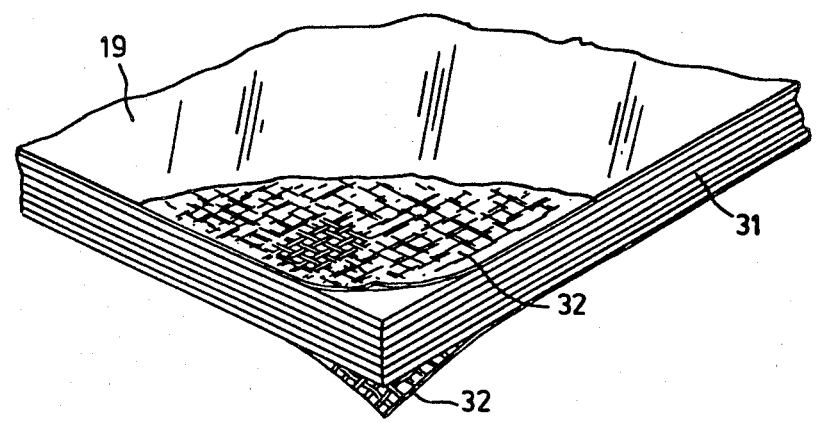
FIG. 3 is a cut-away view of a composite panel, as manufactured according to this invention.

Referring to the drawings in detail, in FIG. 1, a laminating press 10 is indicated, comprising an upper platen 12, positioned to lie in a substantially horizontal plane, and a lower platen 14, positioned beneath it.

The upper platen is adapted to be heated by hot water and steam or electrically to a temperature in the range of 170°–210° F., and is adapted to be raised and lowered by means of hydraulic rams 16, and thereby to be pressed against the lower platen to a force of about 30 p.s.i., which has been found to be suitable in magnitude for accomplishing the task hereinafter described.

Figure 4:
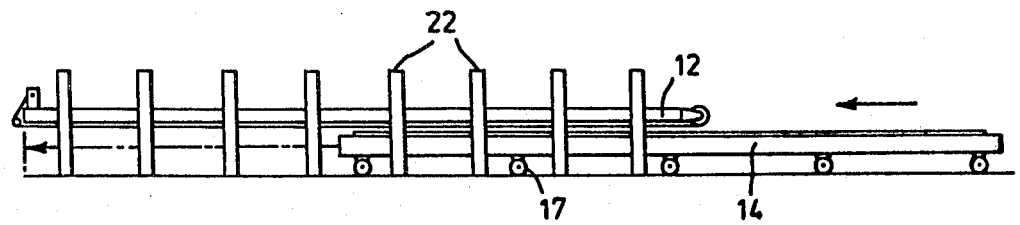
FIG. 4 is a diagrammatic side view of the press having a movable lower platen which is displaced from its operative position.
Figure 5:
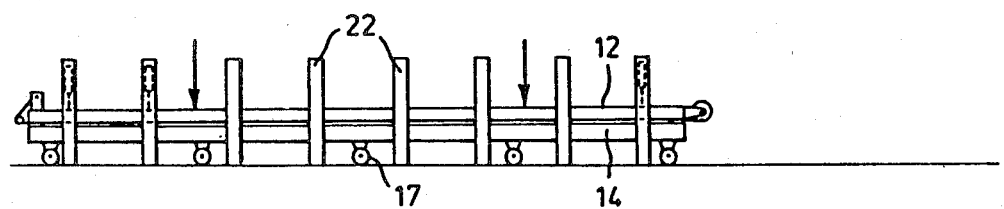
FIG. 5 is a diagrammatic side view of the press, wherein the lower platen is in its operative position directly beneath the upper platen.

The lower platen is adapted to be heated to a temperature of about 120° F. and is equipped with wheels 17, whereby it can be displaced horizontally from its operative position beneath the upper platen (FIG. 5), to a second position (FIG. 4) where the lower platen is exposed to permit the preparation thereon of a composite panel for curing, and to be reinserted thereafter to the operative position.

A first roll 18, is attached at one end of the upper platen, and has a sheet of fluoroplastics film 19 rolled up on it, which is adapted to be unrolled therefrom in a generally horizontal plane beneath the lower face 13 of the upper platen, and spaced apart therefrom. The opposite end of the upper platen has a spacer 20 comprising a roll attached thereto, extending substantially the full width of the press, and spaced vertically from the lower face 13 of the upper platen at a distance in the range of ¾ to 1½ inches. A second roll 21, attached to said opposite end of the upper platen is adapted to take up the end of the film. The second roll 21 can be rotated by a crank 23, to wind the film thereon. The rolls 18, 21 may be equipped with ratchets and pawls or other devices (not shown), whereby the rolls may be held in a fixed position, and thereby holding the film at a desired tension.

A pair of rails 24, of heavy gauge steel, are positioned horizontally, adjacent to, and generally parallel with the sides of the upper platen, and spaced vertically below the plane of the lower face of the upper platen at a distance in the range of ¾ to 1½ inches, when the upper platen is in a raised position. The rails 24 are rigidly attached to steel beams 22 anchored in the ground adjacent the sides of the press.

A composite panel is prepared for curing using conventional techniques of lay-up, on the lower platen, which has been heated to a temperature of about 120° F. while the platen is in the second position, outside the press.

The cured laminated panel (see FIG. 3) consists of a core of ¾ inch 7 ply-Douglas Fir plywood 31, measuring 10×46 feet, with a layer of resin impregnated woven glass fiber material 32 on both sides thereof, a film of fluoroplastics material, preferably a 1½ mil. film of TEDLAR—150BG15WH bonded to one side thereof. The glass fiber is a Type 702—24 ounce/yard woven roving. A polyester resin system is used wherein a catalyst is mixed with the resin, and the roving is impregnated with the mixture. The impregnated woven roving is then applied to the sides of the plywood, which is placed on the lower platen. The resin system preferably has the following ingredients:

| Components | Pts. |
| --- | --- |
| 2T 1008 | 100 |
| CaCo$_3$ | 50 |
| Titanox | 2 |
| MEK | 0.5 |

As will be understood by the man skilled in the art, other resin systems of the thermosetting type may alternatively be used, for example vinyl, epoxy and phenolic resins.

The film of fluoroplastics material 19 is suspended beneath the upper platen, which has been heated to a temperature of about 200° F., and is suspended longitudinally between rolls 18 and 21. The film is then stretched laterally, as shown in FIG. 1 and FIG. 2, by means of elastic cords 26, connected between the sides of the film and the rails 24 at multiple points along the edges of the film. A strip of pressure sensitive tape 28 is attached to one end of a first hook 30, the other end of the tape being stuck onto the upper edge of the film. A second hook 32 on the opposite end of the cord is hooked over the rail 24, causing the film to be stretched laterally, and to be spaced from the heated upper platen by a distance of not less than ¾ inch. While the film is thus suspended it is subjected to preheating by radiation from the upper platen. By stretching such cords between the film and the rails, at multiple points along both sides of the film, any wrinkles, creases, and the like are prevented from forming in the film when the latter is bonded to the composite panel. Care must be taken to avoid contacting the film with the heated upper platen during the stretching process, since contact therewith may cause the film to be warped.

The lower platen, having the uncured composite panel placed upon it, is then reinserted to the first position, so that the panel lies substantially beneath the suspended, stretched film, and vertically spaced therefrom.

The upper platen is then lowered, bringing the suspended film into contact with the surface of the composite panel, and thereupon forcing the film into contact with the hot upper platen. The press is fully closed, to exert a pressure of about 30 p.s.i. on the composite panel, and the latter is then cured therein for a period of from 7 to 25 minutes and preferably, about 15 minutes. The cured, hardened, composite panel is then removed from the press, together with the film which is permanently bonded thereto.

I claim:

1. In a process for manufacturing a laminated panel wherein a plurality of layers are laminated together under heat and pressure in a press having upper and lower platens, the uppermost layer being a thin film of fluoroplastics material, the improvement in which said film is suspended from the upper platen between longitudinally spaced support means and stretched longitudinally and laterally in a substantially horizontal plane spaced from the lower face of said upper platen, the upper platen is lowered to bring the film into contact with the other layer of material while maintaining the spacing of the film from the lower face of the upper platen, and the press thereupon being closed to press the film into contact with the adjacent layer of the laminate.

2. A process for manufacturing a laminated panel which comprises:
   superposing on one face of a laminar core a sheet of resin-impregnated fibrous material,
   positioning the core horizontally, with said superposed sheet uppermost, in a press having upper and lower platens,
   suspending a film of weather resistant fluoroplastics material from the upper platen of the press between longitudinally spaced support means attached thereto,
   stretching the film longitudinally and laterally to cause the film to lie in a substantially horizontal plane spaced from the lower face of said upper platen,
   lowering the upper platen to bring the film into contact with the layer of fibrous material while maintaining the spacing of the film from said lower face of the platen,
   closing the press to press the film into contact with the layer of fibrous material, and
   laminating the assembly under heat and pressure to bond said layer to the core and said film to the layer.

3. A process according to claim 2, in which the laminar core is of plywood.

4. A process according to claim 2, in which the assembly is laminated at a temperature in the range of 170°-210° F. for 7 to 25 minutes.

5. A process for manufacting a laminated panel which comprises:
   superposing on each face of a laminar core a sheet of resin-impregnated woven fibrous material,
   positioning the core horizontally in a press having upper and lower platens, suspending a film of weather resistant fluoroplastics material from the upper platen of the press between longitudinally spaced support means attached thereto, stretching the film longitudinally and laterally to cause the film to lie in a substantially horizontal plane spaced from the lower face of said upper platen, lowering the upper platen to bring the film into contact with the uppermost of said layers while maintaining the spacing between the film and said lower face of the platen, closing the press to press the film into contact with said uppermost layer, and laminating the assembly under heat and pressure to bond said layers to the core and said film to the uppermost layer.

6. A process according to claim 5, wherein said fibrous material is glass fiber material.

* * * * *